Sept. 8, 1942.  W. L. SMITH  2,295,432
BELT
Filed July 3, 1941
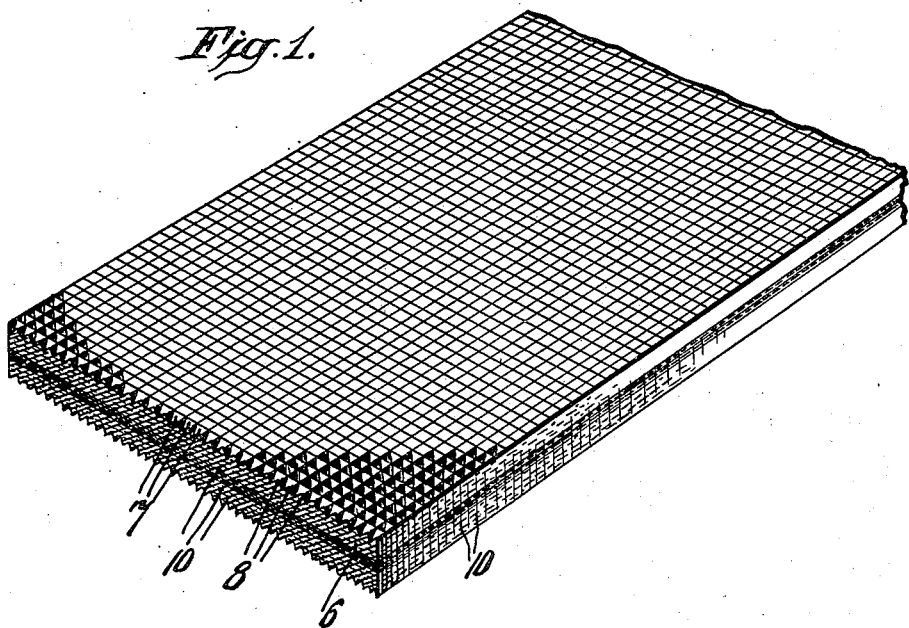
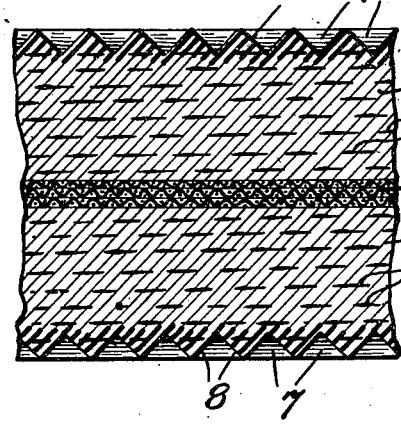
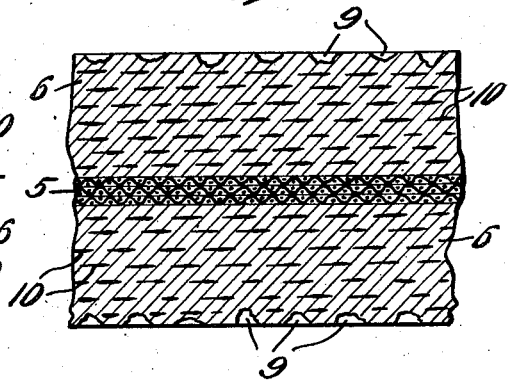
INVENTOR
WESLEY L. SMITH
BY
Byerly, Watson + Aimonde
ATTORNEYS Patented Sept. 8, 1942

2,295,432

UNITED STATES PATENT OFFICE 2,295,432

BELT

Wesley L. Smith, Bedford, Va., assignor to Salta Corporation, Jersey City, N. J., a corporation of Delaware Application July 3, 1941, Serial No. 401,046

4 Claims. (Cl. 74—232)

The invention relates to belts of the type used for conveying materials and for transmitting power and aims to provide a belt having good wearing qualities and capable throughout its life of gripping on smooth and wet surfaces.

In accordance with my invention, a layer of soft, substantially solid rubber containing almost wholly collapsed closed cells is applied to a fabric base. Such rubber is made by expanding a mass of soft rubber compound by means of a blowing agent such as sodium bicarbonate or the like under conditions which retain the gases produced by the blowing agent in closed cells within the mass of compound, and then cooling the rubber mass after vulcanization. The cooling has the effect of condensing or otherwise eliminating the gases produced by the blowing agent so that the soft vulcanized rubber collapses substantially to the volume which it had before expansion. In its collapsed form, it has about the same degree of resiliency and the same wearing qualities as solid unexpanded soft rubber. Such collapsed cellular rubber has been made as an intermediate product in making sponge rubber, but has generally been regarded as of no value in itself.

I have discovered that when the wearing surface of a belt is made of collapsed cellular rubber it is resilient, strong and durable and has the property of gripping on smooth surfaces until it is completely worn away. This property arises from the fact that wear on the outer surface of a belt made of collapsed cellular rubber opens the collapsed cells at the wearing surfaces, relieving the vacuum in those cells so that they expand and serve, by a vacuum-cup action, to prevent the belt from slipping on smooth surfaces. Thus, although the belt has only the normal resiliency of solid, soft rubber, its outer surface, as wear continues, consists always of a thin layer of expanded rubber, pitted with open cells which serve as vacuum cups. To prevent the belt from slipping when it is new, the outer surface of the belt may be pitted with molded indentations to provide an initial vacuum-cup action.

A belt embodying my invention is illustrated in the accompanying drawing in which:

Fig. 1 is a fragmentary perspective view of a cross-section of a conveyor belt;

Fig. 2 is an enlarged fragmentary view of a cross-section of the belt illustrated in Fig. 1; and Fig. 3 is a similar section illustrating the surfaces of the belt after wear.

The belt illustrated in the drawing comprises a base 5 of a strong tough fabric such as canvas, to each of the surfaces of which is applied a layer 6 of almost wholly collapsed, closed-cell cellular soft rubber. When the belt is new, slipping is prevented by the vacuum-cup action of the indentations 7 in the tough outer skin 8. After wear, slipping is prevented by the vacuum-cup action of the open and expanded cells 9 as shown in Fig. 3. The cells 10 in the body remain collapsed until they are exposed by wear.

The layers 6 which have been described may be made by utilizing the first part of a method which has been used for making sponge rubber. This method consists in expanding a mass of rubber compound by sodium bicarbonate or a similar blowing agent which is mixed with the compound before vulcanization. During the first part of the vulcanization, the rubber compound is confined in a mold having an internal volume no greater than the volume of the compound. This prevents any substantial evolution of gas within the rubber compound during the first part of the vulcanization and until the rubber compound has acquired a consistency and tensile strength sufficient to prevent entrapped gas from rupturing it. During the latter part of the vulcanization, the rubber compound is placed in a larger mold. On release from the first mold, or during the final vulcanization in the larger mold, or at both these times, the mass is expanded by gas produced by the blowing agent, so that, at the end of the vulcanization, there is produced a closed-cell cellular soft rubber article having the shape and size of the second mold.

Since the gas produced from sodium bicarbonate or similar blowing agents is of an unstable character, the gas is condensed or in some way chemically eliminated from the cells when the expanded article is cooled, so that it collapses and returns nearly to the size which the compound had before expansion.

In using this method to make a belt embodying my invention, the fabric base 5 is preferably placed along the center line of the mold used in the first part of the vulcanization so that it will be embedded between the layers 6. That mold has a thickness substantially equal to that desired for the belt. The second mold has a thickness several times as great as that of the first mold and, most desirably, has its surfaces roughened to mold indentations in the surfaces of the rubber. The roughened surface of the mold may be a knurled metal surface or a piece of coarse fabric laid in the mold. The roughened surface of the mold has two effects: (1) it molds the indentations in the surface of the rubber, and (2) it allows the the gas trapped in the cells near the surface to escape so that a tough non-cellular outer skin is produced.

It is not essential that the fabric base 5 be embedded in the rubber compound with which it is coated during the curing of that compound. The fabric base may be impregnated with ordinary soft rubber to which the collapsed cellular rubber layer 6 may be attached by means of one of the ordinary rubber cements now on the market, or the collapsed cellular rubber layer 6 may be cemented to the fabric base 5 directly. I prefer to use one of the so-called cold curing rubber cements for this purpose. A hot curing rubber cement may be used, but in that case the belt must be enclosed in a mold which will prevent undue expansion during the curing of the cement.

What I claim is:

1. A belt comprising a fabric base having a surface coated with a layer of soft, substantially solid rubber containing almost wholly collapsed closed cells.

2. A belt comprising a fabric base having a surface coated with a layer of soft, substantially solid rubber containing almost wholly collapsed closed cells and having a tough outer skin pitted with molded indentations.

3. A belt comprising a fabric base, each of whose surfaces is coated with a layer of soft, substantially solid rubber containing almost wholly collapsed closed cells and whose outer surface is pitted with vacuum cups.

4. A belt consisting of a strong fabric impregnated with soft rubber, each of whose surfaces is coated with a layer of soft, substantially solid rubber containing almost wholly collapsed closed cells and whose outer surface is pitted with vacuum cups.

WESLEY L. SMITH.